May 5, 1953  L. M. GERMAIN  2,637,119
PROCESS FOR DRYING GRANULAR VINYL ESTER POLYMERS
Filed June 27, 1950
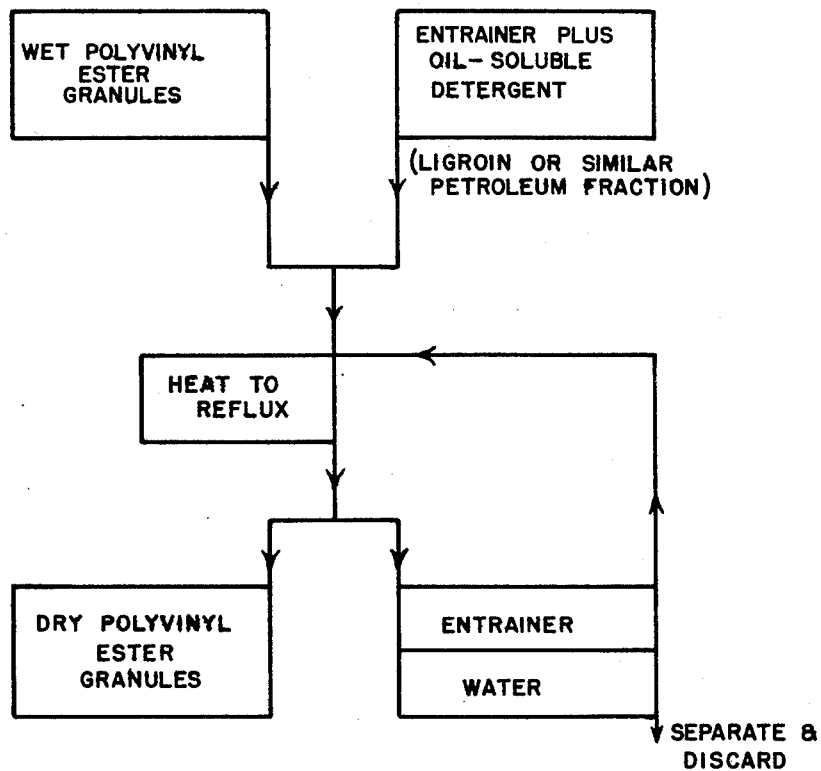
INVENTOR
LEO M. GERMAIN
BY D. R. Morrison.
AGENT Patented May 5, 1953

2,637,119

UNITED STATES PATENT OFFICE 2,637,119

PROCESS FOR DRYING GRANULAR VINYL ESTER POLYMERS

Leo M. Germain, Shawinigan Falls, Quebec, Canada, assignor to Shawinigan Chemicals Limited, Montreal, Quebec, Canada, a corporation of Canada Application June 27, 1950, Serial No. 170,708

3 Claims. (Cl. 34—9)

This invention relates to the removal of water from polymers of vinyl esters that have been polymerized in suspension in aqueous medium to form granular polymer particles. More particularly, this invention relates to the removal of water from such granular polymers by an azeotropic distillation procedure, whereby water in the form of extraneous moisture and also water absorbed in the polymer granules is removed without sintering or fusing together of the granules.

Numerous processes have been described for the preparation of polymers of vinyl acetate in granular form. The procedures in the various processes are similar to each other, and generally are only slightly different from the processes of preparing stable small particle emulsions of the polymers. However, in the latter processes, the polymers are not recovered from the suspending medium. With granular polymers it is desired to recover the particles substantially free of the aqueous phase in which they are polymerized. Recovery may be achieved by filtration of the granules from the aqueous medium, although, more commonly, a centrifuging operation is used to separate the polymer granules; either of these operations achieves a granular product containing at least about 15%, by weight of the granules, of moisture. The residual moisture in the granules after these operations has heretofore been removed by drying the granules at an elevated temperature in an oven and/or current of heated air. The drying of the granules has been accompanied by considerable difficulty, since only a small part of the residual moisture is adhering to the outside of the granules, and most of it is absorbed in the granules as a sort of plasticizer. At the elevated temperatures required to dry the polymer in air, the granules become sufficiently softened to sinter and fuse together to form a rigid mass that is often not readily friable.

It is accordingly an object of this invention to provide a process for removing extraneous and absorbed moisture from granular polymers of vinyl acetate without sintering the granules to a rigid mass. It is a further object of this invention to provide a process which is economical and convenient to handle, and which provides a product readily used in further processing operations. In the drawings the single figure shows a flow sheet.

According to the process of this invention, water is removed from wet granular polymers of vinyl acetate by (1) refluxing a mixture of the granules and a liquid petroleum fraction, in which the polymer is insoluble and of which the maximum boiling point is below about 150° C. and the boiling point under reflux is preferably lower than the boiling point of water, in presence of an oil-soluble detergent, and (2) discarding the water that separates from the liquid reflux before the latter is returned to the polymer granules. It is necessary to have the oil soluble detergent in the petroleum fraction (hereinafter referred to as the entrainer) in order to disperse the water-wet granules of polymer therein; without the detergent the water-wet granules cohere as lumps in the entrainer instead of dispenrsing as individual particles. Examples of suitable detergents are "Alkanol WXN" (a mixture of alkyl sulfonates sold by E. I. Du Pont Co.), "Akoterge O" (a substituted oxaline sold by Commercial Solvents Corp.), and "Vitamul 4N" (condensation products of glycerol or glycols with long chain fatty acids, sold by Yocum-Faust Ltd.)

It is also generally expedient, in order to help prevent sintering of the granules into lumps during refluxing, to soak the granules, prior to refluxing, in an aqueous medium containing a water-soluble dispersing agent of the type made by condensing sulfonic acids of aromatic hydrocarbons with formaldehyde and neutralizing to obtain a salt. In operations where a dispersing agent of this type has been used as an ingredient in the suspension polymerization process of preparing the granules, it is not necessary to include this pre-treatment with water-soluble dispersing agent before refluxing the granules with the entrainer. When the soaking pre-treatment is resorted to, it is usually adequate to soak the granules for a period of five to fifteen minutes in an aqueous solution containing from 0.1 to 1.0%, by weight of the granules, of the water-soluble dispersing agent. The amount of oil-soluble detergent that must be used in the entrainer is usually in the range between 0.2% and 0.5% by weight of the granules.

The following examples illustrate the process, but not the limits, of this invention.

Example 1

A batch of polyvinyl acetate granules was made by suspension polymerization of 32 gallons of vinyl acetate emulsified with partially-hydrolysed polyvinyl acetate emulsifier in aqueous medium, and with hydrogen peroxide as the polymerization catalyst. When the desired degree of polymerization had been achieved, hydroquinone was added to stop the polymerization, and 1½ lb. "Darvan No. 1" (the polymerized sodium salts of alkyl naphthalene sulfonic acid, as sold by R. T. Vanderbilt Co. were added to the aqueous medium in which the granules were retained for a further period of about ten minutes. The granules were then separated from the aqueous medium by centrifuging, and 172 lb. of granular product containing 18% moisture were obtained. The moisture in the product was present partly as surface moisture and partly as water absorbed in the granules of polymer. The 172 lb. of product were slurried with 350 lb. of colorless petroleum fraction, which boiled at 90° C. under total reflux, containing 0.35 lb. of the oil-soluble detergent "Alkanol WXN" (a mixture of alkyl sulfonates sold by E. I. Du Pont Co.). The slurry of polymer granules was refluxed for four hours, during which time water that condensed with the reflux was withdrawn before the reflux was returned to the slurry. At the end of four hours refluxing the granules contained 3% by weight of residual moisture, as determined by distillation with toluene and separation of the water in a water trap. This slurry of polyvinyl acetate granules, almost free of moisture, was suitable without further treatment, for alcoholysis to polyvinyl alcohol, and using the process disclosed in U. S. P. 2,502,715, the granules were converted to powdery polyvinyl alcohol by alcohoylsis with methanol using potassium hydroxide as catalyst.

Example 2

Another sample of polyvinyl acetate granules was prepared by suspension polymerization of vinyl acetate, as in Example 1. When the granules had been centrifuged they still contained 12% by weight of moisture. A batch of 250 lb. of these moist granules was refluxed with 360 lb. of petroleum fraction containing ½ lb. "Alkanol WXN" as in Example 1, for 2¾ hrs.; water separating from the reflux was withdrawn before the reflux was returned to the distillation. At the end of the refluxing period, the moisture content of the granules had been reduced to 1.2% by weight. The granules were suitable immediately for conversion to polyvinyl alcohol, as in the previous example, and a fine dense powder of polyvinyl alcohol was obtained by alcoholysis as in the previous example.

It should be noted particularly that the moisture present with the polymer granules, after their separation from an aqueous phase by filtration or centrifuging, is not only extraneous moisture covering each granule with a film, but includes also water absorbed by the polymer; the absorbed water usually amounts to over 12% by weight of the granules. Water is compatible with polyvinyl acetate to the extent of about 7% by weight of the polymer; absorbed water in excess of this proportion is apparent as haze in the polymer. The process of this invention removes from the polymer granules the extraneous moisture and the absorbed moisture, including the incompatible proportion as well as most of the compatible proportion thereof. This is an unexpected result in view of the fact that the entrainer liquid is incompatible, or compatible to the extent of only a few percent, with the polymer.

Although this specification has described a process applied to polyvinyl acetate granules, it is also applicable to other vinyl esters which contain absorbed water when they are polymerized in aqueous suspension. Also, where a liquid petroleum fraction has been specified, other volatile liquids may be used as entrainers, providing they are substantially immiscible with water and non-compatible with the polymer being treated.

What is claimed is.

1. A process for removing absorbed water from granular polymers of vinyl acetate, comprising (1) boiling a mixture of the polymer granules and a liquid entrainer which boils under reflux below 100° C., which is not miscible with water, and is not a solvent for the polymer, together with a small proportion of an oil-soluble detergent, (2) condensing the so generated vapors, removing the entrained water, and returning the water-free entraining agent to the boiling mixture, and (3) continuing the boiling until a substantial proportion of the absorbed water contained in the granular polymers has been removed.

2. A process as claimed in claim 1, in which the liquid entrainer is a petroleum fraction of which the maximum boiling point is below about 150° C. and the boiling point under reflux is below 100° C.

3. A process as claimed in claim 2, including the preliminary step of soaking the polyvinyl acetate granules in an aqueous solution of a water-soluble dispersing agent of the type made by condensing sulfonic acids of hydrocarbons with formaldehyde and neutralizing to obtain a salt.

LEO M. GERMAIN.

References Cited in the file of this patent

UNITED STATES PATENTS

| Number | Name | Date |
|---|---|---|
| 2,046,757 | Tucker | July 7, 1936 |
| 2,137,404 | Hollerer | Nov. 22, 1938 |
| 2,138,048 | Vesce | Nov. 29, 1938 |
| 2,326,099 | Kokatnur et al. | Aug. 3, 1943 |
| 2,383,128 | Hultquist | Aug. 21, 1945 |
| 2,460,582 | Japs | Feb. 1, 1949 |
| 2,474,910 | Pierce et al. | July 5, 1949 |
| 2,503,913 | Kimberlin et al. | Apr. 11, 1950 |